(12) United States Patent
Balasekaran et al.

(10) Patent No.: US 10,129,613 B2
(45) Date of Patent: Nov. 13, 2018

(54) OPTICAL SWITCH, OPTICAL SWITCHING APPARATUS

(71) Applicant: SUMITOMO ELECTRIC INDUSTRIES, LTD., Osaka (JP)

(72) Inventors: Sundararajan Balasekaran, Yokohama (JP); Hiroshi Inada, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/850,918

(22) Filed: Dec. 21, 2017

(65) Prior Publication Data

US 2018/0184181 A1    Jun. 28, 2018

(30) Foreign Application Priority Data

Dec. 26, 2016    (JP) .................... 2016-251791

(51) Int. Cl.
| | | |
|---|---|---|
| *G02B 6/26* | (2006.01) | |
| *H04Q 11/00* | (2006.01) | |
| *G02F 1/137* | (2006.01) | |
| *H04B 10/11* | (2013.01) | |
| *G02B 6/35* | (2006.01) | |
| *H04B 10/25* | (2013.01) | |

(52) U.S. Cl.
CPC ......... *H04Q 11/0003* (2013.01); *G02B 6/351* (2013.01); *G02B 6/3548* (2013.01); *G02B 6/3594* (2013.01); *G02F 1/13737* (2013.01); *H04B 10/11* (2013.01); *H04B 10/2504* (2013.01)

(58) Field of Classification Search
CPC .... G02B 6/3512; G02B 6/3546; G02B 6/357; G02B 6/356; G02B 6/3556; G02B 6/3518; G02B 6/26
See application file for complete search history.

(56) References Cited

U.S. PATENT DOCUMENTS 8,885,676 B2 * 11/2014  Kub .................. H01S 3/10
                                                    372/22
2005/0064111 A1 * 3/2005 Hiller ............... H01L 21/222
                                                    427/595

OTHER PUBLICATIONS

Nutan Gautam et al., Band engineered HOT midwave infrared detectors based on type-II InAs/GaSb strained layer superiattices, *Infrared Physics & Technology*, vol. 59, 2013, p. 1-p. 6.

* cited by examiner

*Primary Examiner* — Jennifer Doan
(74) *Attorney, Agent, or Firm* — Smth, Gambrell & Russell, LLP.

(57) ABSTRACT

An optical switch includes a first optical absorbing layer sensitive to a first light and having a first superlattice structure and a first bandgap; a second optical absorbing layer sensitive to a second light and having a second bandgap smaller than that of the first bandgap; and a barrier layer having a second superlattice structure. The first optical absorbing layer, the second optical absorbing layer, and the barrier layer are arranged in a direction of an axis to form an arrangement with a first band-offset in a conduction band of the first optical absorbing layer, a second band-offset in a conduction band of the barrier layer, and a well in a conduction band of the second optical absorbing layer.

7 Claims, 8 Drawing Sheets

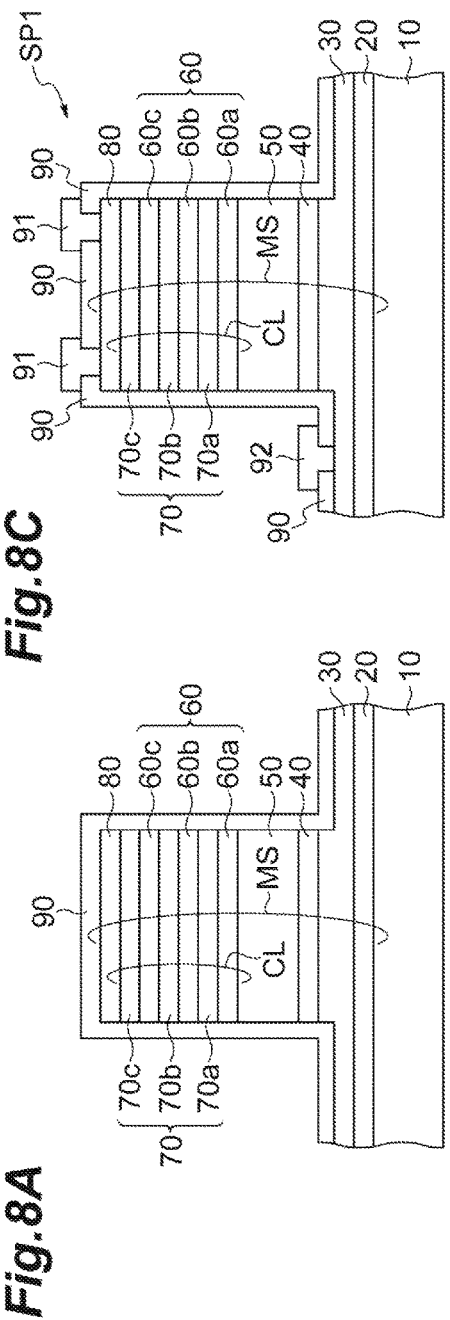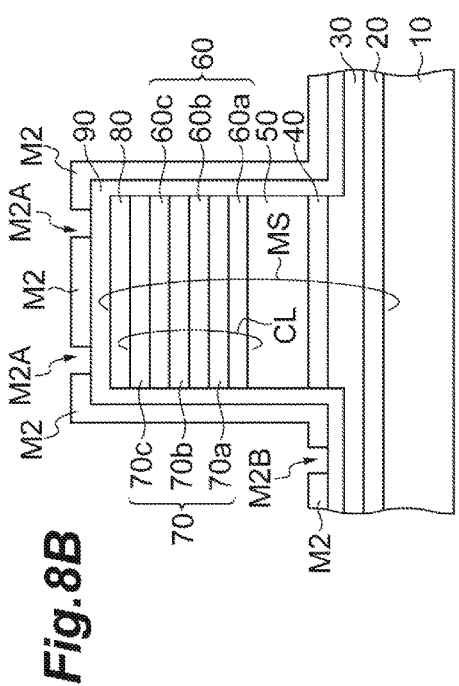

OPTICAL SWITCH, OPTICAL SWITCHING APPARATUS

BACKGROUND OF THE INVENTION

Field of the Invention

The present invention relates to an optical switch and an optical switching apparatus. This application claims the benefit of priority from Japanese Patent application No. 2016-251791 filed on Dec. 26, 2016, which is herein incorporated by reference in its entirety.

Related Background Art

N. Gautam et. Al., "Band engineered HOT midwave infrared detectors based on type-II InAs/GaSb strained layer superlattices", Infrared Physics & Technology, Volume 59, pp. 72-77 (2013), which is referred to as Non-patent document 1, relates to a photodiode for mid infrared light.

SUMMARY OF THE INVENTION

An optical switch according to one aspect of the present invention comprises: a first optical absorbing layer sensitive to a first light, the first optical absorbing layer including a first superlattice structure and having a first bandgap; a second optical absorbing layer sensitive to a second light, the second optical absorbing layer having a second bandgap smaller than that of the first bandgap; and a barrier layer including a second superlattice structure, the first optical absorbing layer, the second optical absorbing layer, and the barrier layer being arranged in a direction of a first axis to form an arrangement, the arrangement forming a first band-offset in a conduction band of the first optical absorbing layer, a second band-offset in a conduction band of the barrier layer, and a well in a conduction band of the second optical absorbing layer.

An optical switching apparatus according to another aspect of the present invention comprises: an optical switch comprising a first optical absorbing layer sensitive to a first light, the first optical absorbing layer including a first superlattice structure and having a first bandgap, a second optical absorbing layer sensitive to a second light, the second optical absorbing layer having a second bandgap smaller than that of the first bandgap; and a barrier layer including a second superlattice structure; and a first light source of the first light, the first light source being optically coupled to the optical switch, the first optical absorbing layer, the second optical absorbing layer, and the barrier layer being arranged in a direction of a first axis to form an arrangement, the arrangement forming a first band-offset in a conduction band of the first optical absorbing layer, a second band-offset in a conduction band of the barrier layer, and a well in a conduction band of the second optical absorbing layer.

BRIEF DESCRIPTION OF THE DRAWINGS

The above-described objects and the other objects, features, and advantages of the present invention become more apparent from the following detailed description of the preferred embodiments of the present invention proceeding with reference to the attached drawings.

FIG. 8A is a schematic view showing a major step in the method for fabricating the optical switch according to the embodiment.

FIG. 8B is a schematic view showing a major step in the method for fabricating the optical switch according to the embodiment.

FIG. 8C is a schematic view showing a major step in the method for fabricating the optical switch according to the embodiment.

DETAILED DESCRIPTION

Figure 1:
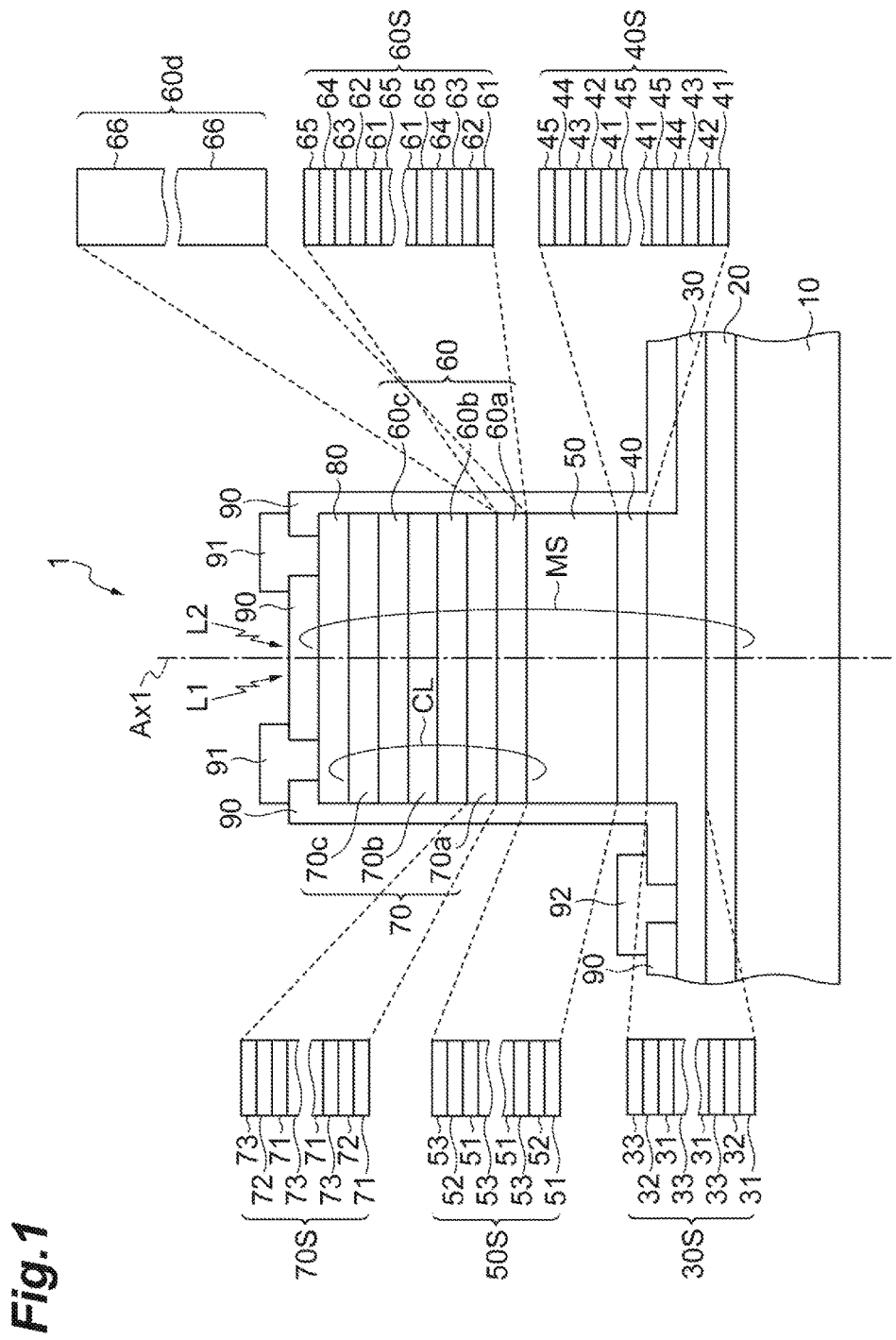
FIG. 1 is a schematic view showing an optical switch according to an embodiment.

The photodiode disclosed in Non-Patent Document 1 includes a p-type contact layer, an electron blocking layer, an optical absorbing layer, a hole blocking layer, and an n-type contact layer. This photodiode allows the optical absorbing layer to generate optically excited electrons, which pass through the hole blocking layer and drift to the n-type contact layer, and produces photocurrent from the electrons.

Inventors' studies reveal that an optical switch that can turn on and off the output of the photocurrent in response to an external control light is useful. Specifically, such an optical switch needs to receive the external control light in addition to incident light, which is to be detected by the optical absorbing layer.

It is an object according to one aspect of the present invention to provide an optical switch that can switch photocurrent, which is produced from light incident on an light absorbing layer thereof, in response to an external control light thereto. It is an object according to another aspect of the present invention to provide an optical apparatus including the optical switch.

Specific embodiments according to the present above aspects are described below.

An optical switch according to an embodiment comprises: (a) a first optical absorbing layer sensitive to a first light, the first optical absorbing layer including a first superlattice structure and having a first bandgap; (b) a second optical absorbing layer sensitive to a second light, the second optical absorbing layer having a second bandgap smaller than that of the first bandgap; and (c) a barrier layer including a second superlattice structure, the first optical absorbing layer, the second optical absorbing layer, and the barrier layer being arranged in a direction of a first axis to form an arrangement, the arrangement forming a first band-offset in a conduction band of the first optical absorbing layer, a second band-offset in a conduction band of the barrier layer, and a well in a conduction band of the second optical absorbing layer.

The optical switch provides the conduction bands of the first optical absorbing layer and the barrier layer with the first and second band offsets, respectively, which depress the conduction band of the second light absorbing layer, so that these band offsets form a well in the second light absorbing layer. The first optical absorbing layer can generate photocurrent carriers by excitation from the valence band to the conduction band in response to the first light of a wavelength longer than that of the second light, and the second light absorbing layer can generate photocurrent carriers by excitation from the valence band to the conduction band in response to the second light of a wavelength shorter than that of the first light. In the optical switch which is illuminated with the second light, the well (the well of the second optical absorbing layer) can accumulate a net quantity of carriers, determined by both the excitation and relaxation of electrons therein, which occupy a part or all of the discrete energy levels in the second light absorbing layer. In a steady state in excitation and relaxation in the second absorbing layer most of the energy levels of which have been occupied, the second absorbing layer in the steady state allows most of the photocurrent carriers from the first absorbing layer to drift across the second absorbing layer, so that the optical switch emits almost all the photocurrent, which is produced by the first light the incident thereon. In the optical switch which is not illuminated with the second light, the well (the well of the second optical absorbing layer) contains carriers at the level of thermal excitation, and the second absorbing layer, which includes many unoccupied levels, causes most of the photocurrent carriers from the first absorbing layer to lose energies in the second absorbing layer, so that the optical switch is scarcely able to emit the photocurrent, which is produced by the first light incident thereon.

In the optical switch according to an embodiment, the first superlattice structure includes an InSb/InAs/GaSb structure.

The optical switch allows the InSb/InAs/GaSb structure of the first absorption layer to generate photocurrent carriers in response to light in desired mid-infrared wavelengths. The first superlattice structure of the first absorbing layer provides a barrier effective in forming the well which traps photocurrent carriers.

In the optical switch according to an embodiment, the first superlattice structure has a third superlattice structure, and the third superlattice structure includes at least one of an InSb/InAs/GaSb/AlSb/GaSb structure or an InSb/InAs/GaSb/AlGaSb/GaSb structure.

The optical switch allows the InSb/InAs/GaSb/AlSb/GaSb structure and the InSb/InAs/GaSb/AlGaSb/GaSb structure to form the well in the second absorbing layer. The third superlattice structure of the second absorbing layer can absorb the second light having a wavelength shorter than that of the first light to produce excited carriers in the well.

In the optical switch according to an embodiment, the second optical absorbing layer is made of an InGaAs layer.

The optical switch allows the bulk layer of InGaAs to form the well in the second absorbing layer. The bulk layer of the second absorbing layer can absorb the second light having a wavelength shorter than that of the first light, and produce excited carriers in the well.

In the optical switch according to an embodiment, the second superlattice structure of the barrier layer includes an InSb/InAs/GaSb structure.

The optical switch allows the InSb/InAs/GaSb structure can provide the barrier layer with a barrier effective in forming the well.

An optical switching apparatus according to an embodiment comprises: (a) an optical switch comprising a first optical absorbing layer sensitive to a first light, the first optical absorbing layer including a first superlattice structure and having a first bandgap, a second optical absorbing layer sensitive to a second light, the second optical absorbing layer having a second bandgap smaller than that of the first bandgap; and a barrier layer including a second superlattice structure; and (b) a first light source of the first light, the first light source being optically coupled to the optical switch, the first optical absorbing layer, the second optical absorbing layer, and the barrier layer being arranged in a direction of a first axis to form an arrangement, the arrangement forming a first band-offset in a conduction band of the first optical absorbing layer, a second band-offset in a conduction band of the barrier layer, and a well in a conduction band of the second optical absorbing layer.

The optical switching apparatus allows the first light, which the first light source produces, to enter the optical switch and the second light, which has a wavelength different from the first light also to enter the optical switch. One of the first light and the second light can be used as control light. The optical switch that receives the control light enables optical excitation in response to the control light to create carriers, which occupy the carrier levels in the well, and the occupation allows the optical switch to emit the photocurrent in response to the other light. The optical switch that does not receive the control light generates no carriers, which the carrier level of the well remain unoccupied, whereby the optical switch fails to emit the photocurrent in response to the other light.

The optical switching apparatus according to an embodiment further comprises a first optical fiber optically coupling the first light source with the optical switch.

The optical switching device allows the first light to enter the optical switch through the first optical fiber.

Teachings of the present invention can be readily understood by considering the following detailed description with reference to the accompanying drawings shown as examples. Referring to the accompanying drawings, an optical switch and an optical switching apparatus according to the present embodiments will be described below. To facilitate understanding, identical reference numerals are used, where possible, to designate identical elements that are common to the figures.

FIG. 1 is a schematic view showing an optical switch according to an embodiment, and specifically, shows the stacking structure of the optical switch. The optical switch 1 includes a first optical absorbing layer 50, a second optical absorbing region 60, and a barrier region 70. The first optical absorbing layer 50 has a first superlattice structure 50S of type II, and is sensitive to a first light component L1. The second optical absorbing region 60 has either a third superlattice structure 60S of type II or a bulk layer 60d, and is sensitive to a second light component L2. The bulk layer 60d has a thickness greater than that of each of the semiconductor thin films constituting the first superlattice structure 50S. The bulk layer 60d, specifically, includes a semiconductor layer that does not have a superlattice structure and is made of, for example, substantially a single material. The second optical absorbing region 60 may include one or more optical absorbing layers, and in the present embodiment, includes a second optical absorbing layer 60a, a second optical absorbing layer 60b, and a second optical absorbing layer 60c. The barrier region 70 has a second superlattice structure 70S of type II. The barrier region 70 may include one or more barrier layers, and in the present embodiment, includes a barrier layer 70a, a barrier layer 70b, and a barrier layer 70c. The second optical absorbing region 60 and the barrier region 70 form a composite layer CL. Specifically, the composite layer CL includes the second optical absorbing layer 60a, the barrier layer 70a, the second optical absorbing layer 60b, the barrier layer 70b, the second optical absorbing layer 60c, and the barrier layer 70c, which are arranged in order along the direction of the first axis Ax1.

The first optical absorbing layer 50 and the composite layer CL are arranged along the direction of the first axis Ax1, and specifically, the first optical absorbing layer 50, the second optical absorbing layer 60a, the barrier layer 70a, the second optical absorption layer 60b, the barrier layer 70b, the second optical absorbing layer 60c, and the barrier layer 70c are arranged in order along the direction of the first axis Ax1. The second optical absorbing layer 60a is disposed between the first optical absorbing layer 50 and the barrier layer 70a to form a well. The second optical absorbing layer 60b is disposed between the barrier layer 70a and the barrier layer 70b to form another well. The second optical absorbing layer 60c is disposed between the barrier layer 70b and the barrier layer 70c to form a further well.

Figure 2:
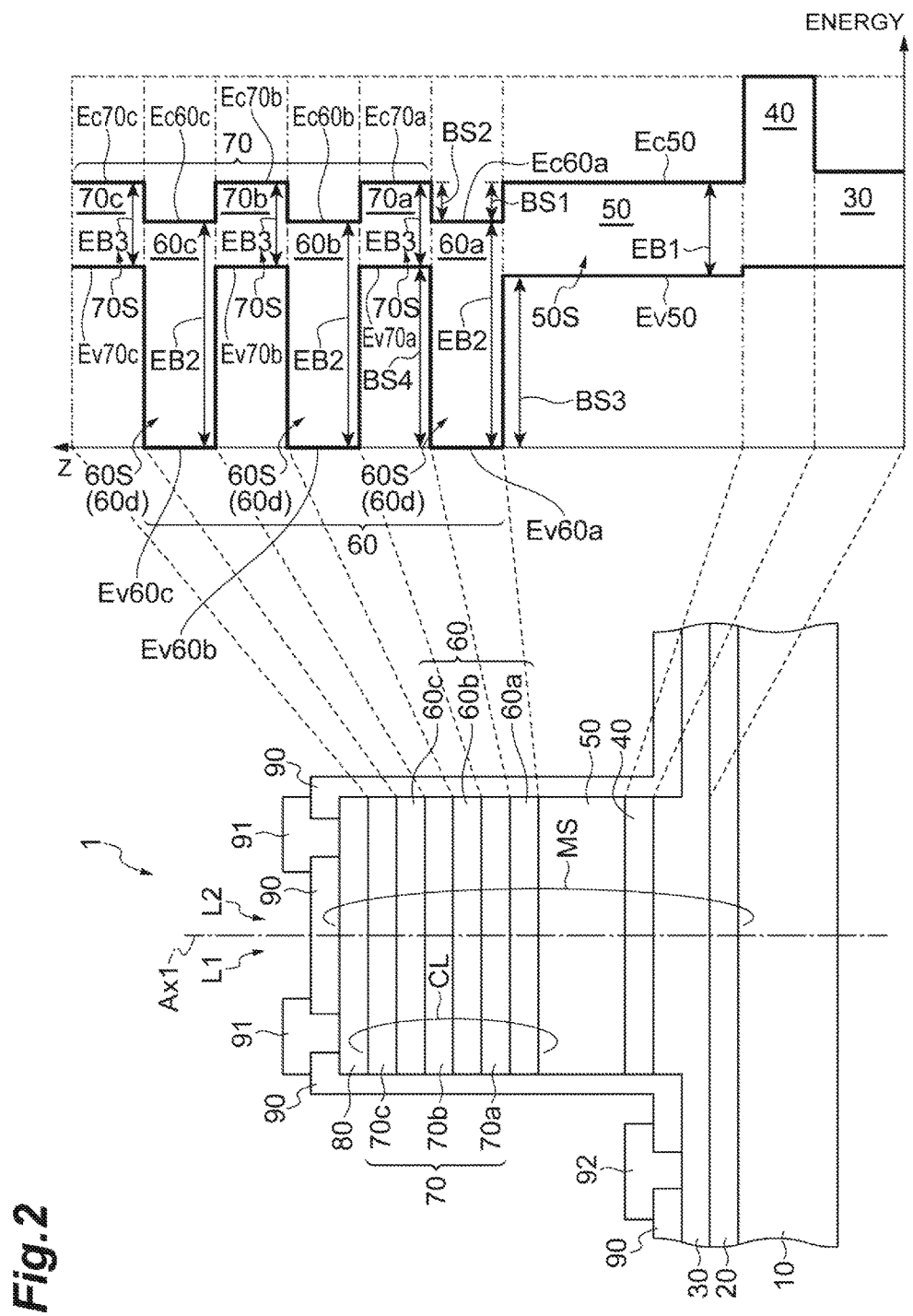
FIG. 2 is a schematic view showing a band diagram of a conduction band and a valence band in the optical switch according to the embodiment.

FIG. 2 is a schematic view showing a conduction band and a valence band in the optical switch according to the present embodiment. The first optical absorbing layer 50 has a conduction band Ec50, which the first superlattice structure 50S forms. The second optical absorbing layer 60a, the second optical absorbing layer 60b, and the second optical absorbing layer 60c have a conduction band Ec60a, a conduction band Ec60b, and a conduction band Ec60c, respectively, and these conduction bands each have a third superlattice structure 60S or bulk layer 60d. The conduction bands Ec60a, Ec60b, and Ec60c each have an energy level lower than the conduction band Ec50 of the first optical absorbing layer 50. The barrier layers 70a, 70b and 70c have a conduction band Ec70a, a conduction band Ec70b and a conduction band Ec70c, respectively, and these conduction bands are formed by the second superlattice structure 70S. The conduction bands Ec70a, Ec70b, and Ec70c each have an energy level higher than the conduction bands Ec60a, Ec60b, and Ec60c. The first optical absorbing layer 50 provides a first band offset BS1 (a band offset to the conduction band Ec50) in the second optical absorbing layer 60a. The barrier layers 70a, 70b, and 70c each provide a second band offset BS2 (a band offset with respect to the conduction bands Ec70a, Ec70b, and Ec70c). The first band offset BS1 of the first optical absorbing layer 50, and the second band offset BS2 of the barrier layers 70a, 70b, and 70c form respective wells in the second optical absorbing layers 60a, 60b, and 60c. The first and second band offsets BS1 and BS2 can be, for example, in the following ranges.
First band offset BS1: around 40 to 60 meV.
Second band offset BS2: around 40 to 60 meV.

In the optical switch 1, the first optical absorbing layer 50 has a valence band Ev50, which the first superlattice structure 50S forms. The second optical absorbing layer 60a, the second optical absorbing layer 60b, and the second optical absorbing layer 60c have a valence band Ev60a, a valence band Ev60b, and a valence band Ev60c, respectively, and these valence bands are formed by the third superlattice structure 60S or bulk layer 60d. The barrier layer 70a, the barrier layer 70b and the barrier layer 70c have a valence band Ev70a, a valence band Ev70b and a valence band Ev70c, respectively, and these valence bands are formed by the second superlattice structure 70S. The valence bands Ev60a, Ev60b, and Ev60c of the second optical absorbing layers are lower than the valence band Ev50 of the first optical absorbing layer 50, and the first optical absorbing layer 50 provides the second optical absorbing layer 60a with a band offset BS3 (a band offset for valence band Ev50). The valence bands Ev60a, Ev60b, and Ev60c are lower than the valence bands Ev70a, Ev70b, and Ev70c of the barrier layers, and the barrier layers 70a, 70b and 70c provide the second optical absorbing layers 60a, 60b and 60c with a fourth band offset BS4 (a band offset to the valence bands Ev70a, Ev70b, and Ev70c). The third and fourth band offsets BS3 and BS4 can be, for example, in the following ranges.
Third band offset BS3: around 250 to 270 meV.
Fourth band offset BS4: around 250 to 270 meV.

As shown in FIG. 2, the second bandgap energy EB2 of the second optical absorbing layers 60a, 60b, and 60c is larger than the first bandgap energy EB1 of the first optical absorbing layer 59. The second bandgap energy EB2 of the second optical absorbing layers 60a, 60b and 60c is larger than that of the third bandgap energy EB3 of the barrier layers 70a, 70b and 70c. The bandgap energy EB1, the second bandgap energy EB2, the difference between the first bandgap energy EB1 and the second bandgap energy EB2, and the third bandgap energy EB3 are in the following ranges.
First bandgap energy EB1: (80 meV to 400 meV)
Second bandgap energy EB2: (350 meV to 800 meV)
Difference between the first bandgap energy EB1 and the second bandgap energy EB2: 400 meV or more.
Third bandgap energy EB3: (80 meV to 400 meV).

The first light L1 passes through the barrier layers 70a, 70b, and 70c and the second optical absorbing layers 60a, 60b, and 60c to enter the first optical absorbing layer 50. The second light L2 passes through the barrier layer 70a, 70b, and/or 70c to enter the second optical absorbing layers 60a, 60b, and/or 60c. The second light L2 passes through the barrier layers 70a, 70b, and 70c, and the second light L2 thus passed is absorbed by the second optical absorbing layers 60a, 60b, and 60c, and if any, the remaining light enters the first optical absorbing layer 50.

An exemplary optical switch is shown below.
Film thickness of the first optical absorbing layer 50: for example, (1000 nm to 2000 nm).
Film thickness of the second optical absorbing layer 60a: 200 nm to 550 nm, for example, 350 nm.
Film thickness of the barrier layer 70a: 200 nm to 600 nm, for example, 300 nm.
The first optical absorbing layer 50 having a thickness of not smaller than the lower limit of the above range absorbs the first light L1 to generate carriers the amount of which can turn on the optical switch. The second optical absorbing layer 60a having a thickness of the lower limit or more prevents the quantum well thereof from forming a discrete level, and absorbs not the first light L1 but the second light L2. The second optical absorbing layer 60a having a thickness of the upper limit or less allows carriers to move across the second optical absorbing layer 60a at a low bias voltage, and the barrier layer 70a having a thickness of the lower limit or lower can prevent a quantum coupling between the second optical absorbing layers between which the barrier layer 70a is disposed.

First light L1: 3 to 15 micrometers in wavelength.
Second light L2: 0.9 to 2.5 micrometers in wavelength.

Figure 3A:
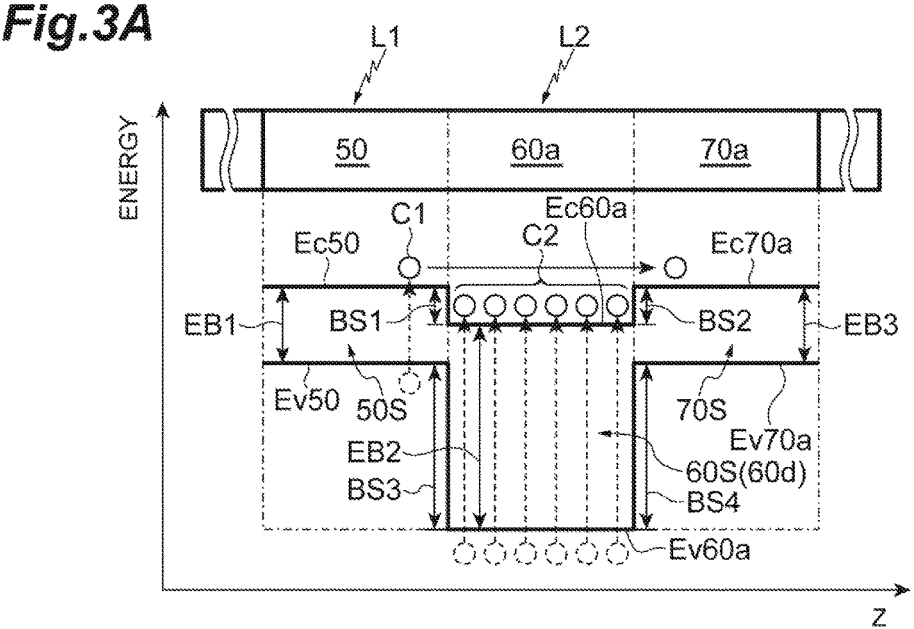
FIG. 3A is a schematic view showing a band diagram of the conduction bands and the valence bands of the first optical absorbing layer, the second optical absorbing layer and the barrier layer in the optical switch according to the embodiment.
Figure 3B:
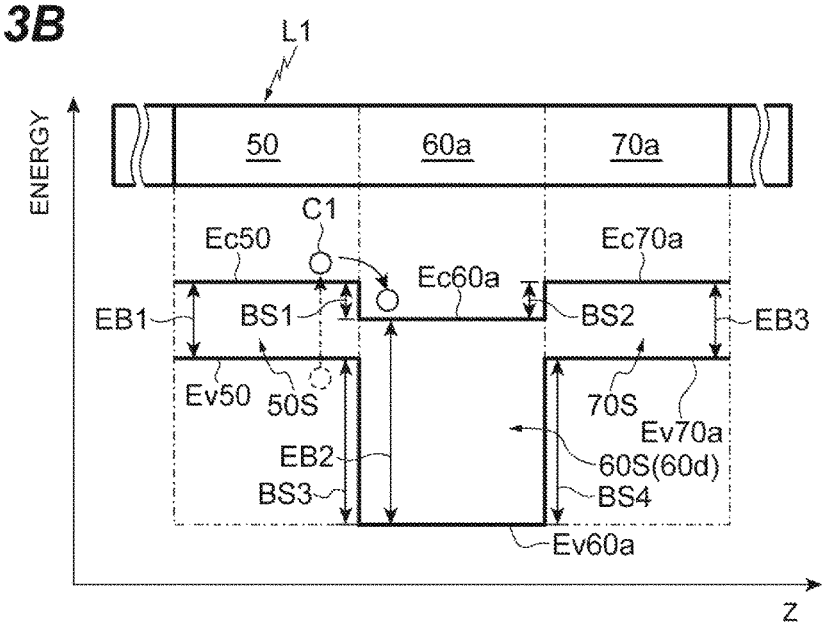
FIG. 3B is a schematic view showing a band diagram of the conduction bands and the valence bands of the first optical absorbing layer, the second optical absorbing layer and the barrier layer in the optical switch according to the embodiment.

FIGS. 3A and 3B are schematic views each showing the conduction band and the valence band of the first optical absorbing layer, the second optical absorbing layer, and the barrier layer in the optical switch according to the embodiment. In order to avoid complication, FIGS. 3A and 3B do not show all of the wells and show one of the wells (the well in the conduction band), which is formed by the first optical absorbing layer 50, the second optical absorbing layer 60a, and the barrier layer 70a.

As shown in FIG. 3A, the first optical absorbing layer 50 generates photocurrent carriers C1 by excitation from the valence band Ev50 of the first optical absorbing layer 50 to the conduction band Ec50 thereof in response to the first light L1 longer than the second light L2. The second optical absorbing layer 60a generates carriers C2 by excitation from the valence band Ev60a of the second optical absorbing layer 60a to the conduction band Ec60a thereof in response to the second light L2 having a wavelength shorter than that of the first light L1. In a state (a steady state) in which the number of carriers excited by incidence of the second light L2 and the number of carriers, relaxed to the valence band Ev60a, among the excited carriers equilibrate, the optical switch that receives both the first light L1 and the second light L2 accumulates the carriers C2 in the well of the second optical absorbing layer 60a, so that a small number of empty levels are left in the wall. Most of the photocurrent carriers C1 are accelerated by the electric field to flow across the second optical absorbing layer 60a accumulating the carrier C2 therein without being captured by the second optical absorbing layer 60a that contains the small number of empty levels. The well having few empty levels allows the optical switch 1 to output photocurrent of the quantity that corresponds to the intensity of the first light L1.

As shown in FIG. 3B, the optical switch that receives the first light L1 and does not receive the second light L2 accumulates thermally excited carriers, i.e., the carriers C2, in the well of the second optical absorbing layer 60a, so that the second optical absorbing layer 60a has a large number of empty levels which are not occupied by carriers C2. Most of the photocurrent carriers C1 from the first optical absorbing layer 50 lose energies by collision in the second optical absorbing layer 60a, and the carriers thus collided are captured to occupy the empty levels of the well (the well of the second optical absorbing layer 60a). The empty levels in the well prevent the optical switch 1 from outputting photocurrent of the quantity which corresponds to the intensity of the first light L1.

Figure 4:
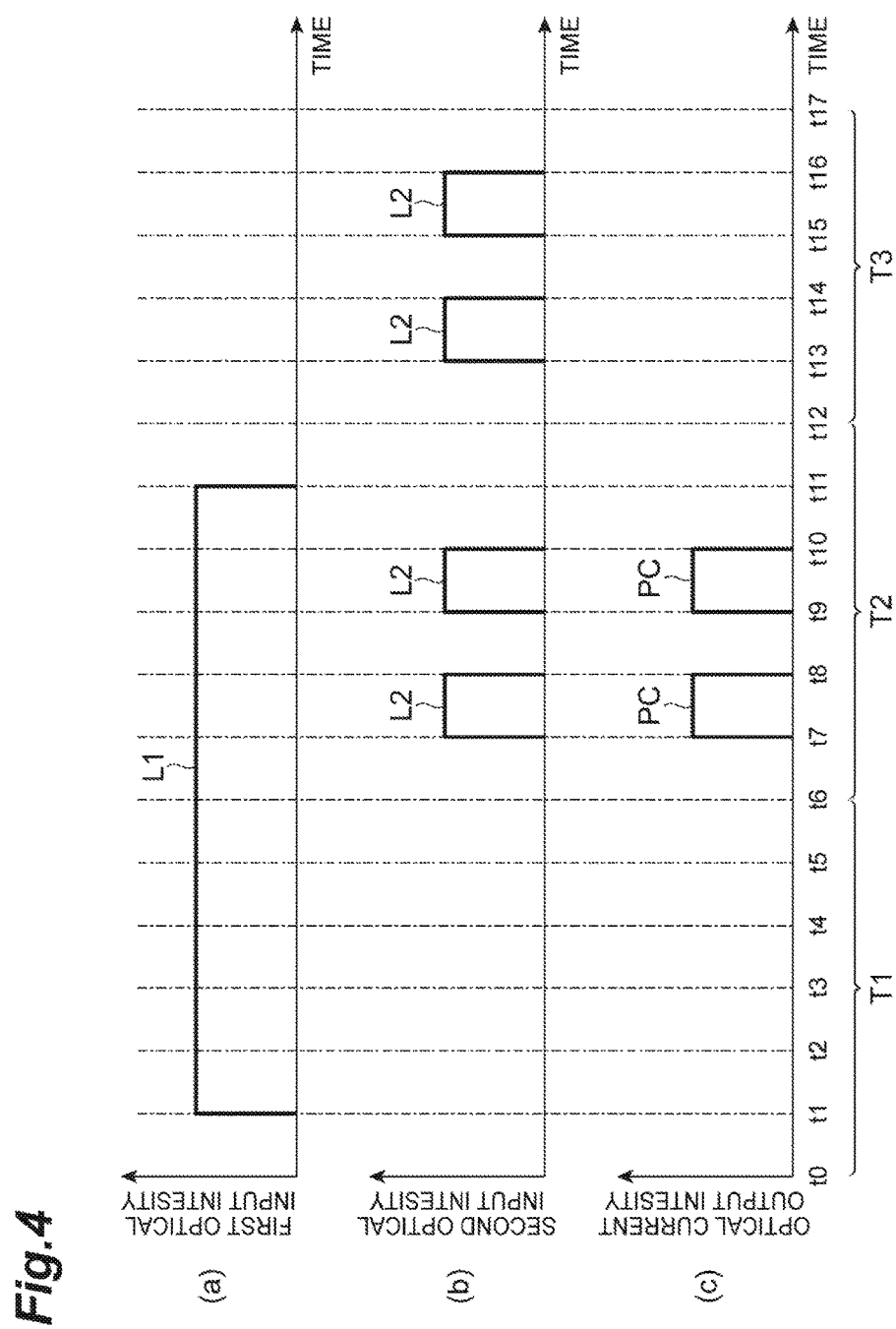
FIG. 4 is a view showing optical inputs and an optical output of the optical switch according to the embodiment.

FIG. 4 is a schematic view showing waveforms of the photocurrent and optical signals incident on the optical switch according to the present embodiment. FIG. 4 includes part (a) showing the waveform of the first light L1 incident on the optical switch 1, and part (b) showing the waveform of the second light L2. FIG. 4 also includes part (c) showing the waveform of the photocurrent PC that the optical switch 1 emits.

As shown in part (a) of FIG. 4, the first light L1 is supplied to the first optical absorbing layer 50 of the optical switch 1 in the period of times t1 to t11. As shown in the part (b) of FIG. 4, the second light L2 is supplied to the second optical absorbing layer 50 of the optical switch 1 in the periods of times t7 to t8, times t9 to t10, times t13 to t14, and times t15 to t16.

In the first period T1 (the period from times t0 to t6), the optical switch 1 receives the first light L1 and does not receive the second light L2. In this period, photocurrent PC is not output as shown in part (c) of FIG. 4. Specifically, as shown in FIG. 3B, the first optical absorbing layer 50 generates the photocurrent carriers C1 in response to the first light L1, but the second optical absorbing layer 60a does not generate any carriers. No incidence of the second light L2 on the second optical absorbing layer 60a disables the well of the second optical absorbing layer 60a to be filled with the carriers C2. Most of the photocurrent carriers C1 are trapped in the well of the second optical absorbing layer 60a.

In the second period T2 (the period from times t6 to t12), the optical switch 1 receives the first light L1 in the period of times t6 to t11 and does not receive the first light L1 in the period of times t11 to t12. The optical switch 1 receives the second light L2 in the periods of the times t7 to t8 and the times t9 to t10. In the periods of the times t7 to t8 and times t9 to t10, the optical switch 1 receives both the first light L1 and the second light L2. In this period, as shown in part (c) of FIG. 4, the optical switch 1 emits photocurrent. More specifically, as shown in FIG. 3A, the second optical absorbing layer 60a generates the carriers C2 in response to the incidence of the second light L2, and the carriers C2 thus generated stay in the well of the second optical absorbing layer 60a. The first optical absorbing layer 50 generates the photocurrent carriers C1 in response to the incidence of the first light L1. The accumulation of the carriers C2 in the second light absorbing layer 60a allows most of the photocurrent carriers C1 to traverse the second light absorbing layer 60a without being captured thereby.

In the third period T3 (period from times t12 to t17), the optical switch 1 receives the second light L2 and does not receive the first light L1. In this period, as shown in part (c) of FIG. 4, the optical switch 1 does not emit the photocurrent PC. Specifically, in the third period T3, the second optical absorbing layer 60a generates the carriers C2 in response to the incidence of the second light L2, and the carriers C2 thus generated accumulates in the well of the second optical absorbing layer 60a. No incidence of the first light L1 on the optical switch 1 disables the first optical absorbing layer 50 to generate the photocurrent carriers C1.

Referring again to FIG. 1, the optical switch 1 will be described below. The first optical absorbing layer 50 has a first superlattice structure 50S including a stack of first unit structures, arranged to form a first bandgap EB1, each of which includes, for example, an array of III-V semiconductor thin films having different bandgaps.

Each of the barrier layers 70a, 70b, and 70c has a second superlattice structure 70S, which has multiple second units arranged to form the second bandgap EB2. The second unit structures each include, for example, an array of III-V semiconductor thin films having different bandgaps.

Each of the second optical absorbing layers 60a, 60b, and 60c has a third superlattice structure 60S or a bulk layer 60d. The third superlattice structure 60S includes a stack of third unit structures, arranged to form a third bandgap EB3, each of which includes, for example, an array of group III-V semiconductor thin films having different bandgaps.

One of the group III-V semiconductor thin films in the first superlattice structure 50S, the second superlattice structure 70S, and the third superlattice structure 60S contains antimony (Sb) as a group V element, and for example, arsenic (As) as another group V element, and contains at least one of, for example, In, Ga and Al as a group III element. Another one of the group III-V semiconductor thin films contains, for example, at least one of Sb and As as a group V element, and at least one of, for example, In, Ga, and Al. The group III-V semiconductor thin film contains constituent elements that allow the superlattice structure to have a type-II band structure.

Specifically, the first optical absorbing layer 50 has a stack of the first unit structures, which constitutes a first superlattice structure 50S, each including a GaSb layer 51, an InAs layer 52, and an InSb layer 53. All or part of the GaSb layer 51, the InAs layer 52, and the InSb layer 53 are doped with p-type dopant, such as Be, so that the first optical absorbing layer 50 exhibits p-type conductivity. The stacking number of the first unit structures is, for example, 200.

The first optical absorbing layer 50 may provide the first superlattice structure 50S with, for example, an InSb/InAs/GaSb structure. The InSb/InAs/GaSb structure can provide the first optical absorbing layer 50 which is sensitive to light in desired mid-infrared wavelengths. In addition, the first superlattice structure 50S of the first optical absorbing layer 50 can provide a barrier, which forms the well in the second optical absorbing layer. The stacking number of the first unit structures in the first superlattice structure 50S of the first optical absorbing layer 50 is in the range of 160 to 240. The concentration of p-type dopant, for example, Be dopant in the first superlattice structure 50S of the first optical absorbing layer 50 can be in the range of $0.1 \times 10^{16}$ to $1 \times 10^{16}$ cm$^{-3}$.

Specifically, the second unit structures each includes the GaSb layer 71, the InAs layer 72, and the InSb layer 73, and a stack of the second unit structures constitutes the second superlattice structure 70S. All or part of the GaSb layer 71, the InAs layer 72, and the InSb layer 73 contain an n-type dopant, such as Si, so that the barrier layers 70a, 70b, and 70c each have n-type conductivity. The stacking number of the second unit structures is, for example, 50.

Specifically, the third unit structures each include the GaSb layer 61, the AlSb layer 62, the GaSb layer 63, the InAs layer 64, and the InSb layer 65, and the stack of the third unit structures constitutes a third superlattice structure. All or part of the GaSb layer 61, the AlSb layer 62, the GaSb layer 63, the InAs layer 64, and the InSb layer 65 contain an n-type dopant, such as Si, so that the second optical absorbing layer has n-type conductivity. The stacking number of the third unit structures in the third superlattice structure 60S is, for example, 50.

The second optical absorbing layer may include a third superlattice structure 60S, such as an InSb/InAs/GaSb/AlSb/GaSb structure. The InSb/InAs/GaSb/AlSb/GaSb structure can form a band offset that can define a well in the second optical absorbing region 60. The stacking number of the third unit structures in the third superlattice structure 60S of each of the second optical absorbing layers 60a, 60b, and 60c is in the range of 40 to 60. The concentration of dopant, for example, Be dopant in the third superlattice structure 60S for the second optical absorbing layers 60a, 60b, and 60c can be in the range of $1 \times 10^{16}$ to $1 \times 10^{17}$ cm$^{-3}$. The third superlattice structure 60S has a larger bandgap than that of the first superlattice structure 50S, thereby absorbing the second light L2 having a wavelength shorter than that of the first light L1. This optical absorption can excite carriers to the wells of the conduction band thereof, and the carriers thus excited stay in the wells (the wells of the second optical absorbing layer).

Alternatively, any or all of the second light absorbing layers 60a, 60b, and 60c may include one or more III-V semiconductor thick films. Specifically, the III-V semiconductor thick films each have a thickness thicker than any film of a superlattice structure, and may be arranged so as not to form a superlattice structure. More specifically, each III-V semiconductor thick film has a band structure of the III-V semiconductor which can contribute to electronic transition in the III-V semiconductor thick film. In view of such a technical aspect, the III-V semiconductor thick films of the second optical absorbing layer each are referred to as a bulk layer. The second light absorbing layer may be composed of a bulk layer 60d of a single semiconductor, and the bulk layer 60d may be made of a single layer of, for example, an InGaAs layer 66, which may be doped with an n-type dopant, such as Si. The InGaAs layer can form a well. The bulk layer 60d can absorb the second light L2, which has a wavelength shorter than that of the first light L1, to produce excited carriers in the well.

The optical switch 1 further includes a substrate 10, a p-type buffer layer 20, a first superlattice layer 30, a second superlattice layer 40, and an n-type capping layer 80. The p-type buffer layer 20, the first superlattice layer 30, the second superlattice layer 40, the first optical absorbing layer 50, the composite layer CL (the second optical absorbing region 60, and the barrier region 70), and the n-type capping layer 80 can be arranged in order on the principal surface of the substrate 10 in the direction of the first axis Ax1.

The substrate 10 includes a III-V semiconductor, such as, Te-doped GaSb. The p-type buffer layer 20 includes, for example, Be-doped GaSb. The n-type capping layer 80 includes a group III-V semiconductor, for example, Si-doped InAs.

The first superlattice layer 30 includes, for example, a group III-V semiconductor superlattice structure 30S, which comprises unit structures each including multiple III-V semiconductor thin films, for example, unit structures each including a Be-doped GaSb layer 31, a Be-doped InAs layer 32, and a Be-doped InSb layer 33, an array of which forms a type-II band structure. The unit structures are stacked in the direction of the first axis Ax1, and the stacking number of unit structures is, for example, 50.

The second superlattice layer 40 includes, for example, a group III-V semiconductor superlattice structure 40S, which comprises unit structures each including multiple III-V semiconductor thin films, having a type-II band structure, and the unit structures each include an undoped GaSb layer 41, an undoped InAs layer 42, an undoped GaSb layer 43, an undoped InAs layer 44, and an undoped InSb layer 45. The unit structures are stacked in the direction of the first axis Ax1, and the stacking number of the unit structures is, for example, 16.

The optical switch 1 further includes a protective film 90, a first electrode 91, and a second electrode 92. The protective film 90 can cover the surface of the semiconductor mesa MS in the optical switch 1. The semiconductor mesa MS includes the p-type buffer layer 20, the first superlattice layer 30, the second superlattice layer 40, the first optical absorbing layer 50, the composite layer CL (the second optical absorbing region 60, and the barrier region 70) and the n-type capping layer 80. The first electrode 91 is connected to the n-type capping layer 80 through the opening of the protective film 90, and the second electrode 92 is connected to the p-type buffer layer 20 through another opening of the protective film 90. In the optical switch 1, the first light L1 and the second light L2 are incident on the top face of the semiconductor mesa MS through the protective film 90.

If necessary, the optical switch 1 may have semiconductor layers of p-type and n-type conductivities opposite to those of the above embodiment. In this optical switch 1, an n-type buffer layer, a composite layer (a second optical absorbing region, a barrier region), a first optical absorbing layer, a second superlattice layer, a first superlattice layer, and a p-type capping layer are arranged in order on the principal surface of the substrate 10. The optical switch 1 has an n-type buffer layer instead of the p-type buffer layer 20, and a p-type capping layer instead of the n-type cap layer 80.

The barrier layers 70a, 70b, and 70c each may include a second superlattice structure 70S, such as an InSb/InAs/GaSb structure, to build barriers to form a well. The stacking number of the second unit structures in the second superlattice structure 70S of each of the barrier layers 70a, 70b, and 70c is, for example, 50. The concentration of dopant, for example, Si dopant in the second superlattice structure 70S of the barrier layers 70a and 70b can be in the range of $2 \times 10^{16}$ to $1 \times 10^{17}$ cm$^{-3}$. The first optical absorbing layer 50 forms a junction with the second optical absorbing layer 60a, and the second optical absorbing layer 60a is in direct contact with the barrier layer 70a. Each of the second optical absorbing layers 60b and 60c is in direct contact with the adjacent barrier layer.

Example 1

Figure 5A:
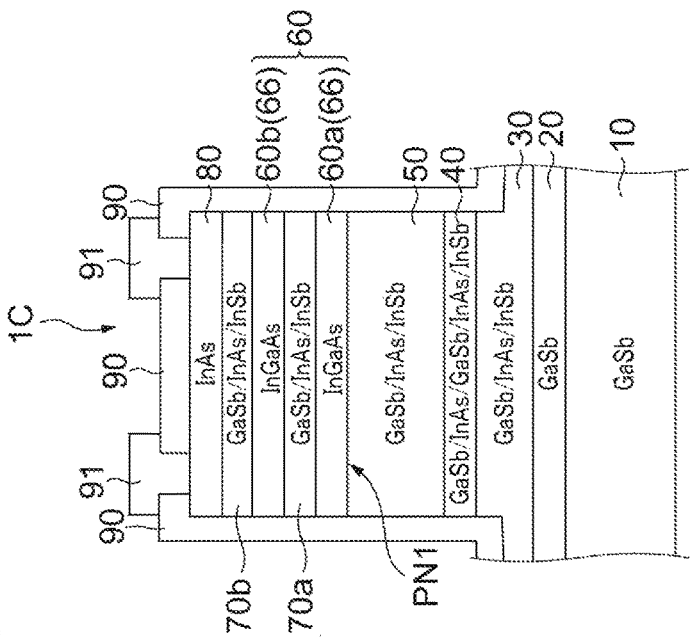
FIG. 5A is a schematic view showing an optical switch according to the embodiment.
Figure 5B:
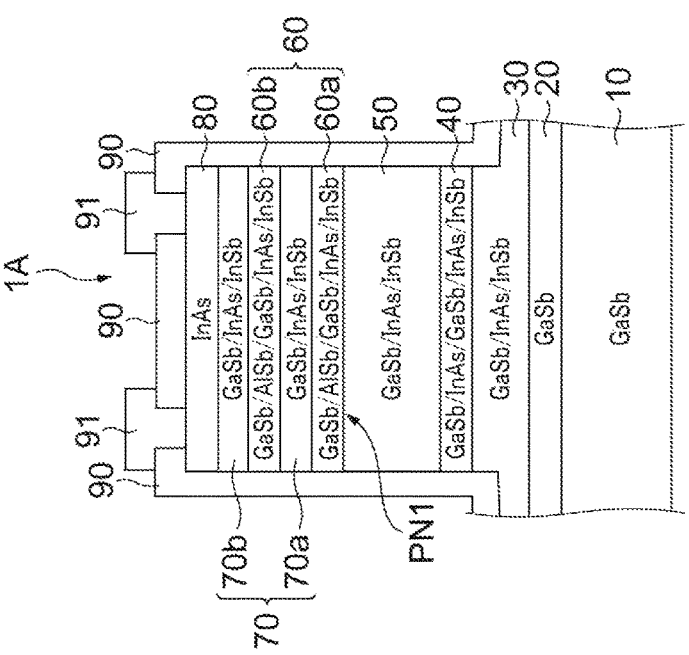
FIG. 5B is a schematic view showing an optical switch according to the embodiment.

FIGS. 5A and 5B are schematic views each showing the laminate structure of the optical switch according to the present embodiment. Referring to FIG. 5A, the optical switch 1A according to the first embodiment includes the p-type buffer layer 20, the first superlattice layer 30, the second superlattice layer 40, the first optical absorbing layer 50, the second optical absorbing region 60, the barrier Region 70, and the n-type cap layer 80. The first superlattice layer 30 works as a p-type contact layer, and the second superlattice layer 40 works as an electron barrier layer. The second optical absorbing region 60 has two second optical absorbing layers 60a and 60b, and the barrier region 70 has two barrier layers 70a and 70b.

In FIG. 5A, the material of layers in the optical switch 1A is shown below.
An exemplary structure of the optical switch 1A according to the first embodiment
First superlattice layer 30
Laminate structure: Be-doped GaSb/Be-doped InAs/Be-doped InSb,
Concentration of Be: $2 \times 10^{16}$ cm$^{-3}$.
Stacking number of the unit structures: 50 (Number of quantum wells may vary).
Thickness: 257 nm (Thickness may vary, for example 250 nm to 500 nm).
Second superlattice layer 40
Laminate structure: GaSb/InAs/GaSb/InAs/InSb.
Dopant: Undoped.
Stacking number of the unit structures 16 (stacking numbers may vary).
Thickness of the superlattice structure: 160.16 nm, (for example, from 100 nm to 350 nm).
First optical absorbing layer 50
Superlattice structure: GaSb/Be-doped InAs/InSb.
Concentration of Be: $1 \times 10^{16}$ cm$^{-3}$.
Stacking number of the unit structures: 200 (may vary, for examples 150 to 400 units).
Thickness of the superlattice structure: (for examples 1000 nm to 2500 nm. Depending on the design)
Second optical absorbing layers 60a and 60b
Superlattice structure: GaSb/AlSb/GaSb/InAs/InSb
Concentration of Si: $1 \times 10^{16}$ to $2 \times 10^{16}$ cm$^{-3}$, for example $2 \times 10^{16}$ cm$^{-3}$.
Stacking number of the unit structures: 50 (may vary from 30 to 100)
Thickness of the superlattice structure: for example 200 to 550 nm.
Barrier layers 70a, and 70b
Superlattice structure: GaSb/Si-doped InAs/Si-doped InSb.
Concentration of Si: $2 \times 10^{16}$ to $1 \times 10^{17}$ cm$^{-3}$, for example $2 \times 10^{16}$ cm$^{-3}$.
Stacking number of the unit structures: 50 (may vary from 30 to 100)
Thickness of the superlattice structure: (for example 200 to 600 nm)
P-type buffer layer 20: Be-doped GaSb.
Be concentration: $3 \times 10^{18}$ cm$^{-3}$.
Film thickness: For example 1000 nm to 2000 nm
n-type capping layer 80: Si-doped InAs.
Concentration of Si: $3 \times 10^{18}$ cm$^{-3}$.
Thickness: For example 20 nm to 200 nm
Material of substrate 10: Te-doped GaSb.
Protective film 90: SiO$_2$, thickness: 200 to 400 nm.
First band offset BS1: (around 60 meV)
Second band offset BS2: (around 60 meV)
First band gap EB1: (this device band gap can be adjusted by adjusting the InAs/GaSb layer superlattice thickness)
EB1 band gap can be adjusted from 80 meV to 400 meV)
Second band gap EB2: 350 meV to 800 meV
Third band gap EB3: 80 meV to 400 meV The optical switch 1A performs a desired operation in response to the first light having a wavelength of 3 to 15 micrometers, and the second light having a wavelength of 0.9 to 2.5 micrometers.

As described above, the first optical absorbing layer 50 has p-type conductivity, and the second optical absorbing layers 60a and 60b and the barrier layers 70a and 70b have n-type conductivity. In the optical switch 1A according to the first embodiment, the first optical absorbing layer 50 forms a p-n junction PN1 with the second optical absorbing layer 60a which is located closest to the first optical absorbing layer 50, and the application of an external voltage allows a depletion layer to spread at the p-n junction PN1, and in the depletion, optical excitation occurs layer to produce carriers. The carrier concentration of the first optical absorbing layer 50 is smaller than the carrier concentration of the second optical absorbing layer 60a.

Example 2

Referring to FIG. 5B, the optical switch 1B of the second embodiment is different from that in Example 1 in that the second optical absorbing layers 60a and 60b are formed of the bulk layer 60d, which is made of a single semiconductor including no superlattice structure. The second optical absorbing layers 60a and 60b made of a single semiconductor makes it easy to form the second optical absorbing layers 60a and 60b which can absorb light of wavelength up to 1.6 micrometers.

Exemplary second optical absorbing layers 60a and 60b in the optical switch 1B of Example 2.
Second optical absorbing layer 60a and 60b
Laminate structure: InGaAs bulk.
Concentration of Si: $1 \times 10^{16}$ to $2 \times 10^{16}$ cm$^{-3}$, for example, $2 \times 10^{16}$ cm$^{-3}$.
Thickness: around 500 nm.
The composition ratio between In and Ga of the second optical absorbing layers 60a and 60b: In/Ga=47/53.
First band offset BS1: 250 meV (around 250 meV)
Second band offset BS2: 80 meV (around 80 meV)

Second bandgap EB2: 740 meV (around 750 meV)

The first optical absorbing layer 50 has p-type conductivity, and the second optical absorbing layers 60a and 60b and the barrier layers 70a and 70b have n-type conductivity. In the optical switch 1B according to the second embodiment, the first optical absorbing layer 50 forms a p-n junction PN1 with the second optical absorbing layer 60a closest to the first optical absorbing layer 50, and a depletion layer spreads at the p-n junction PN1, so that in the depletion layer, photoexcitation of carriers occurs.

In response to the first light L1 having a wavelength of 5 micrometers and the second light L2 having a wavelength of 1.6 micrometers, the optical switch 1B operates in a desired manner.

Figure 6:
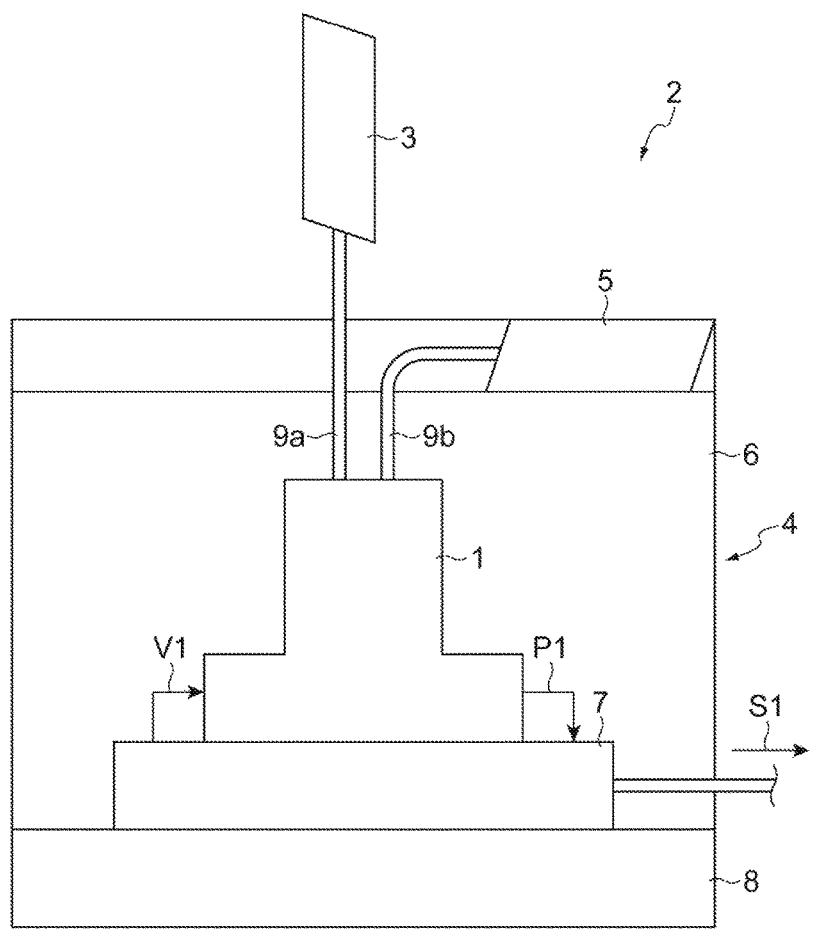
FIG. 6 is a schematic view showing an optical switch device according to the embodiment.

FIG. 6 is a schematic view showing the optical switching device according to the embodiment. The optical switching device 2 includes the optical switch 1, a housing 4, a cooling chamber 6, a control device 7, and a cooling device 8, and may further include at least one of a first light source 3 and a second light source 5. The cooling device 8 cools the optical switch 1 and the control device 7. The optical switch 1 is disposed in the cooling chamber 6 and connected to the control device 7. For example, the control device 7 applies a bias voltage V1 to the optical switch 1, and processes the photocurrent P1, supplied by the optical switch 1, to generate an electric signal S1. The control device 7 provides an electrical signal S1 to an external device. The cooling device 8 can cool the cooling chamber 6 in response to a signal supplied by the control device 7. The temperature in the cooling chamber 6 is, for example, in the range of an absolute temperature of 77 K to 200 K.

The optical switch device 2 may further include a first light input fiber 9a and a second light input fiber 9b. One of the first and second light sources 3 and 5 generates the first light L1, and the other generates the second light L2. The first and second light sources 3 and 5 are optically coupled to the optical switch 1 to supply the first light L1 and the second light L2 through the first light input fiber 9a and the second light input fiber 9b to the optical switch 1, respectively.

In the present embodiment, the first light source 3 generates the first light L1, and the second light source 5 generates the second light L2. The first light L1 has a wavelength of, for example, 3 micrometers, and the second light L2 has a wavelength of, for example, 2 micrometers. The first and/or second light input fibers 9a and 9b each may include a holey fiber.

A method of fabricating the optical switch will be described below. FIGS. 7A, 7B, 7C, 8A, 8B, and 8C are schematic views each showing a major step in the method for fabricating the optical switch according to the embodiment. A substrate 10 of III-V semiconductor is prepared, and as shown in FIG. 7A, the following semiconductors are sequentially grown on the substrate 10 to form a semiconductor laminate SL: a III-V semiconductor layers for the p-type buffer layer 20; a III-V semiconductor superlattice structure for the first superlattice layer 30; a superlattice III-V semiconductor superlattice structure for the second superlattice layer 40; a III-V semiconductor superlattice structure for the first optical absorbing layer 50; a III-V semiconductor superlattice structure for the second optical absorbing region 60; a group III-V semiconductor superlattice structure for the barrier region 70; and a group III-V semiconductor layer for the n-type capping layer 80. These growing steps are carried out, for example, by molecular beam epitaxy (MBE).

An example of the p-type buffer layer 20, the first superlattice layer 30, the second superlattice layer 40, the first optical absorbing layer 50, the second optical absorbing region 60, the barrier region 70, and the n-type cap layer 80 is shown below.

Semiconductor substrate: Te-doped GaSb substrate, GaSb (100) plane.

P-type buffer layer 20: Be-doped GaSb.

First superlattice layer 30: Be-doped GaSb/Be-doped InAs/Be-doped InSb superlattice structure.

Second superlattice layer 40: undoped GaSb/undoped InAs/undoped GaSb/undoped InAs/undoped InSb superlattice structure.

First optical absorbing layer 50: Be doped GaSb/Be doped InAs/Be doped InSb superlattice structure.

Second optical absorbing region 60: Si-doped GaSb/Si-doped AlSb/Si-doped GaSb/Si-doped InAs/Si-doped InSb superlattice structure.

Barrier region 70: Si-doped GaSb/Si-doped InAs/Si-doped InSb superlattice structure.

N-type capping layer 80: Si-doped InAs.

Figure 7C:
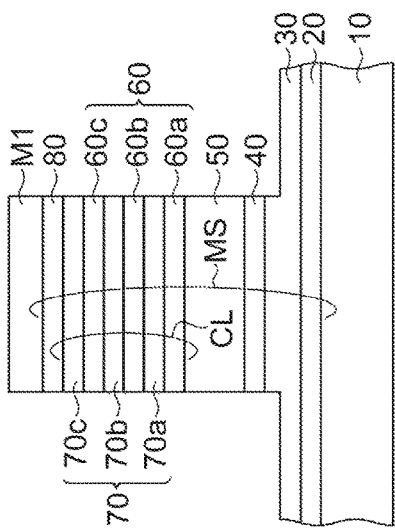
FIG. 7C is a schematic view showing a major step in a method for fabricating an optical switch according to the embodiment.
Figure 7A:
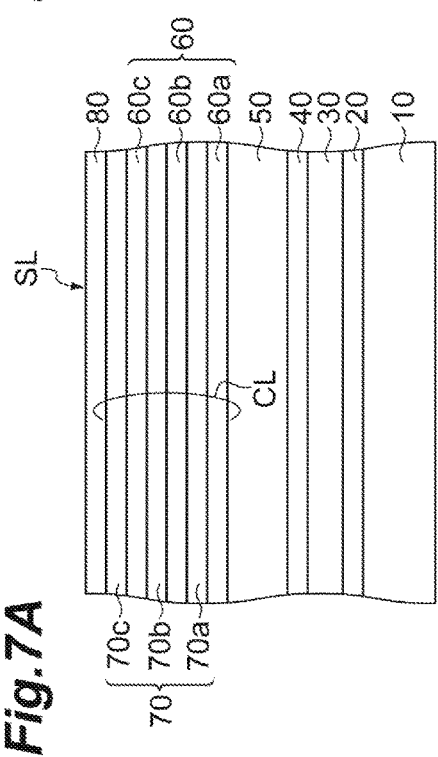
FIG. 7A is a schematic view showing a major step in a method for fabricating an optical switch according to the embodiment.
Figure 7B:
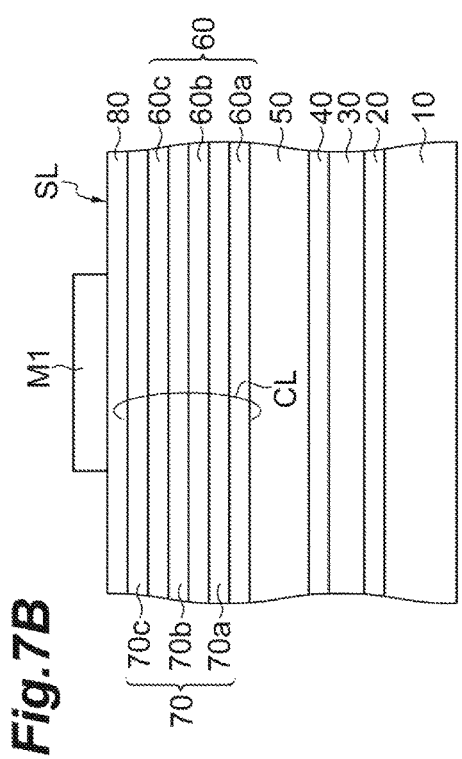
FIG. 7B is a schematic view showing a major step in a method for fabricating an optical switch according to the embodiment.

As shown in FIG. 7B, on the principal surface of the semiconductor stack SL, a first mask M1 is formed which has a pattern defining the semiconductor mesa MS. The first mask M1 includes, for example, SiN or $SiO_2$.

As shown in FIG. 7C, the semiconductor laminate SL is etched using the first mask M1 to form a semiconductor mesa MS. This etching is stopped in the middle of the first superlattice layer 30, and can be a dry etching and/or a wet etching. The dry etching can use, for example, hydrogen iodide or silicon chloride gas as an etchant. The wet etching can use, for example, an aqueous solution containing phosphoric acid and hydrogen peroxide water as an etchant. After the semiconductor mesa MS is formed, the first mask M1 is removed.

As shown in FIG. 8A, a protective film 90 is formed so as to cover the semiconductor mesa MS and the etched first superlattice layer 30. The protective film 90 includes, for example, SiN or $SiO_2$, and is formed by a film-forming method, such as plasma CVD.

As shown in FIG. 8B, a second mask M2 is formed on the protective film 90. The second mask M2 includes, for example, SiN and has openings M2A and M2B. The second mask M2 is used to etch the protective film 90. After this etching, the second mask M2 is removed. A first electrode 91 and a second electrode 92 are formed, which are connected thereto through the first and second openings M2A and M2B, respectively. This formation of the electrodes uses a mask, and the mask includes resist. The mask has a pattern of a first opening which is located on the semiconductor mesa MS and defining the first electrode 91, and a second opening which is located on the p-type buffer layer 20 and defining the second electrode 92.

As shown in FIG. 8C, the first and second electrodes 91 and 92 are formed using a mask, for example, by vapor deposition and lift-off. These steps produce a substrate product SP1. The first and second electrodes 91 and 92 may include, for example, Ti/Pt/Au/Ni/Au. The substrate product SP1 thus produced is polished on the back side of the substrate 10 to have a desired thickness, and the polished substrate product SP1 is further separated by cleavage to form chips for a semiconductor light receiving device.

Having described and illustrated the principle of the invention in a preferred embodiment thereof, it is appreciated by those having skill in the art that the invention can be modified in arrangement and detail without departing from such principles. We therefore claim all modifications and variations coining within the spirit and scope of the following claims.

What is claimed is:

1. An optical switch comprising:
a first optical absorbing layer sensitive to a first light, the first optical absorbing layer including a first superlattice structure and having a first bandgap;
a second optical absorbing layer sensitive to a second light, the second optical absorbing layer having a second bandgap smaller than that of the first bandgap; and
a barrier layer including a second superlattice structure, the first optical absorbing layer, the second optical absorbing layer, and the barrier layer being arranged in a direction of an axis to form an arrangement, the arrangement forming a first band-offset in a conduction band of the first optical absorbing layer, a second band-offset in a conduction band of the barrier layer, and a well in a conduction band of the second optical absorbing layer.

2. The optical switch according to claim 1, wherein the first superlattice structure includes an InSb/InAs/GaSb structure.

3. The optical switch according to claim 1, wherein the second optical absorbing layer has a third superlattice structure, the third superlattice structure including at least one of an InSb/InAs/GaSb/AlSb/GaSb structure or an InSb/InAs/GaSb/AlGaSb/GaSb structure.

4. The optical switch according to claim 1, wherein the second optical absorbing layer is made of InGaAs.

5. The optical switch according to claim 1, wherein the second superlattice structure of the barrier layer includes an InSb/InAs/GaSb structure.

6. An optical switching apparatus comprising:
an optical switch including a first optical absorbing layer sensitive to a first light, the first optical absorbing layer including a first superlattice structure and having a first bandgap, a second optical absorbing layer sensitive to a second light, the second optical absorbing layer having a second bandgap smaller than that of the first bandgap; and a barrier layer including a second superlattice structure; and
a light source for the first light, the light source being optically coupled to the optical switch, wherein
the first optical absorbing layer, the second optical absorbing layer, and the barrier layer are arranged in a direction of an axis to form an arrangement, the arrangement forming a first band-offset in a conduction band of the first optical absorbing layer, a second band-offset in a conduction band of the barrier layer, and a well in a conduction band of the second optical absorbing layer.

7. The optical switching apparatus according to claim 6, further comprising a first optical fiber optically coupling the first light source with the optical switch.

* * * * *